United States Patent [19]

Ishida et al.

[11] Patent Number: 5,084,793

[45] Date of Patent: Jan. 28, 1992

[54] MECHANICAL APPARATUS HAVING A MECHANISM FOR PREVENTING CONGLUTINATION OF CONTACT PARTS

[75] Inventors: Atsuo Ishida; Asao Sasamoto; Toshio Shiono, all of Odawara; Kazuyoshi Hanada, Hadano; Hideo Amano, Odawara, all of Japan

[73] Assignee: Hitachi, Ltd., Tokyo, Japan

[21] Appl. No.: 448,723

[22] Filed: Dec. 11, 1989

[30] Foreign Application Priority Data

Dec. 14, 1988 [JP] Japan .................... 63-315681

[51] Int. Cl.$^5$ .......................................... G11B 5/56
[52] U.S. Cl. ...................... 360/97.02; 360/75; 360/109
[58] Field of Search ............ 360/97.02, 105, 106, 360/109, 75

[56] References Cited

U.S. PATENT DOCUMENTS

| | | | |
|---|---|---|---|
| 4,686,595 | 8/1987 | Bryer | 360/105 X |
| 4,814,908 | 3/1989 | Schmitz | 360/109 X |
| 4,841,397 | 6/1989 | Maeda | 360/105 |
| 4,969,057 | 11/1990 | Inomata et al. | 360/105 X |

Primary Examiner—John H. Wolff
Attorney, Agent, or Firm—Fay, Sharpe, Beall, Fagan, Minnich & McKee

[57] ABSTRACT

The invention provides an improved mechanical apparatus having a driving mechanism for moving two movably contacting members relative to each other. The driving mechanism is combined with a temperature-displacement converter which drives the two members to be displaced relative to each other in response to a variation of the environmental temperature independently of operation of the driving mechanism. The temperature-displacement converter provides a fine displacement of the movable contacts in response to a variation of the environmental temperature to prevent a possible adhesive phenomenon between the two members or a possible increase of the sliding resistance between them, thereby preventing an adhesive phenomenon between a magnetic head of the CSS type and a magnetic disk of a magnetic disk device and so forth. A more effective operation is attained by further employment of a one-way clutch which is put into a coupled condition only when the relative displacement by the temperature-displacement converting means occurs in a predetermined direction but into a non-coupled condition when the relative movement is caused by the driving mechanism.

14 Claims, 4 Drawing Sheets

MECHANICAL APPARATUS HAVING A MECHANISM FOR PREVENTING CONGLUTINATION OF CONTACT PARTS

BACKGROUND OF THE INVENTION

1. Field of the Invention

This invention relates to a mechanical apparatus having movable contacts such as information apparatus such as a magnetic disk device, a business machine, a personal or domestic apparatus or the like and a method of storing such mechanical apparatus. More particularly to prevention of a so-called conglutination phenomenon a phenomenon of an increase in operation resistance at movable contacts which may occur when such apparatus is left in an inoperative condition and so forth.

2. Description of the Prior Art

Description is first given of present situations of the prior art of a magnetic disk device which is used as an external storage device for a computer or a business machine and is one of representative technical apparatus to which the present invention can be applied. Conventionally, the record density of a magnetic disk serving as a storage medium increases as the gap between such magnetic disk and a magnetic head for recording and reproducing information on and from such magnetic disk decreases. Therefore, in recent years, magnetic disk devices commonly employ a so-called floating head system wherein a magnetic head and a surface of a magnetic disk are separated from each other by a very thin air layer.

By the way, in recent years, in order to achieve a further increase of the record density, a so-called contact start stop system (hereinafter referred to as CSS system) is adopted wherein surfaces of a magnetic head and a magnetic disk are mirror finished while the load to urge the magnetic head toward the surface of the magnetic disk against the dynamic lift of an air layer is set to a comparatively high value so as to further decrease the gap between the magnetic head and the magnetic disk such that, when rotation of the magnetic disk is stopped, the magnetic disk and the magnetic head are put into a mutually touching condition.

Meanwhile, a lubricant is commonly applied to a surface of a magnetic disk in order to decrease the sliding friction or resistance between the magnetic disk and a magnetic head and to prevent abrasion of them.

With such CSS system, however, since a magnetic head contacts at a location of a mirror finished surface of a magnetic disk in a stopping condition, an adhesive phenomenon or so-called ringing occurs between the magnetic head and the magnetic disk. Such adhesive phenomenon is promoted where lubricant applied to the surface of the magnetic disk accumulates at contacts between the magnetic disk and the magnetic head, and there is a problem that, where they are left in the condition for a long period of time, the sliding friction between the magnetic disk and the magnetic head increases so much that starting of rotation of the magnetic disk may be difficult or the magnetic disk and/or the magnetic head may be damaged.

Such technique as disclosed, for example, in Japanese Patent Laid-Open No. 63-9089 is conventionally known as a countermeasure for the problem.

In particular, upon starting of rotation of a magnetic disk from a stationary condition, a carriage arm on which a magnetic head is carried is swung to cancel a possible adhering condition between the magnetic head and the magnetic disk to prevent such problem as described above.

The technique described above, however, pays no attention to progress of an adhesive phenomenon during a disconnecting term in a condition in which no power source is connected to a magnetic disk device, such as upon packing, during keeping or storage or during transportation. Accordingly, there is a problem that a possible increase of the sliding friction between a magnetic disk and a magnetic head during such a disconnecting term cannot be prevented.

The problem of such increase of the sliding friction at movable contacts is likely to be caused by disconnection for a long period of time even with regard to movable contacts of a personal device such as a camera or a watch or a domestic electric device. In addition to the adhesive phenomenon described above, rust or mildew makes another problem.

SUMMARY OF THE INVENTION

It is an object of the present invention to provide a mechanical apparatus having movable contacts which can prevent an adhesive phenomenon and a possible increase of a sliding resistance or friction between such contacts which are caused when the apparatus is left in a disconnected condition, and particularly a magnetic disk device which can prevent a possible increase of the sliding friction between a magnetic disk and a magnetic head whether or not the device is connected to a power source.

It is another object of the present invention to provide a motor for a magnetic disk device which can prevent a possible increase of the sliding friction between a magnetic disk and a magnetic head whether or not the motor is connected to a power source.

It is a further object of the present invention to provide a method of storing an apparatus having mechanical contacts such as a storing method for a magnetic disk device which can prevent a possible increase of the sliding friction between a magnetic disk and a magnetic head while the apparatus is stored.

In order to attain the above objects, the present invention provides an improved mechanical apparatus having a driving mechanism for moving two movable contacting members relative to each other. A temperature-displacement converter combined with the driving mechanism is also provided for driving one of the members to be displaced relative to the other in response to a variation of the environmental temperature independent of operation of the driving mechanism, wherein the temperature-displacement converter provides a fine displacement to the movable contacts in response to a variation of the environmental temperature thereby to prevent a possible adhesive phenomenon between the two members or a possible increase of the sliding friction between them.

A magnetic disk device to which the mechanical apparatus of the present invention is applied comprises a magnetic disk, a shaft on which the magnetic disk is supported, a first driving mechanism for rotating the magnetic disk by way of the shaft, a magnetic head for recording or reproducing information on or from the magnetic disk, a movable holder for supporting the magnetic head for displacement relative to the magnetic head, a second driving mechanism for controlling the displacement of the magnetic head relative to the magnetic disk by way of the movable holder, and a temperature-displacement converting means for providing relative displacement between the magnetic disk and the movable holder in response to a variation of the environmental temperature.

Further, the mechanical apparatus can be used more effectively where a one-way clutch is employed which is put into a coupled condition only when the relative displacement by the temperature-displacement converting means takes place in a predetermined direction but put into a non-coupled condition when the relative movement takes place by the driving mechanism.

With the magnetic disk device described above, a displacement is caused in the temperature-displacement converting means by a variation of the environmental temperature and is transmitted to the magnetic head which contacts with the magnetic disk in a stationary state by way of the movable holder kept in touch with the temperature-displacement converting means. Therefore whether or not a power source is connected to the magnetic disk device, a possible increase of the sliding friction between the magnetic disk and the magnetic head which arises from the fact that the condition wherein the magnetic head contacts with a same location of the magnetic disk continues can be prevented with certainty.

Further, with the magnetic disk device which employs such a one-way clutch as described above, the magnetic disk is held in contact with the magnetic head while rotation thereof by the first driving means is stopped, is rotated in the predetermined one direction by a displacement which is caused in the temperature-displacement converting means by a variation of the environmental temperature. Therefore a possible increase of the adhesive force between the magnetic disk and the magnetic head which arises from the fact that the condition wherein the magnetic head contacts with a particular location of the magnetic disk continues can be prevented.

Further, according to the present invention, it is effective, as a novel method of storing a magnetic disk device, to intentionally change the environmental temperature of the magnetic disk device. With the method, a displacement can be caused with certainty in the temperature-displacement converting means incorporated in the magnetic disk device, and it can be prevented by such displacement that the condition wherein the magnetic head contacts with a particular location of the magnetic disk continues.

Further, a possible increase of the adhesive force between the magnetic disk and the magnetic head can be prevented.

In addition, the present invention provides a motor for driving such mechanical apparatus. The motor rotates the magnetic disk in a predetermined one direction relative to the magnetic head in a stationary condition whether or not a power source is connected to the motor during a disconnecting term such as when the magnetic disk device is at rest. Consequently, a possible increase of the adhering force between the magnetic disk and the magnetic disk which arises from the fact that the condition wherein the magnetic head contacts with a particular location of the magnetic disk continues can be prevented.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

Embodiment 1

Figure 1:
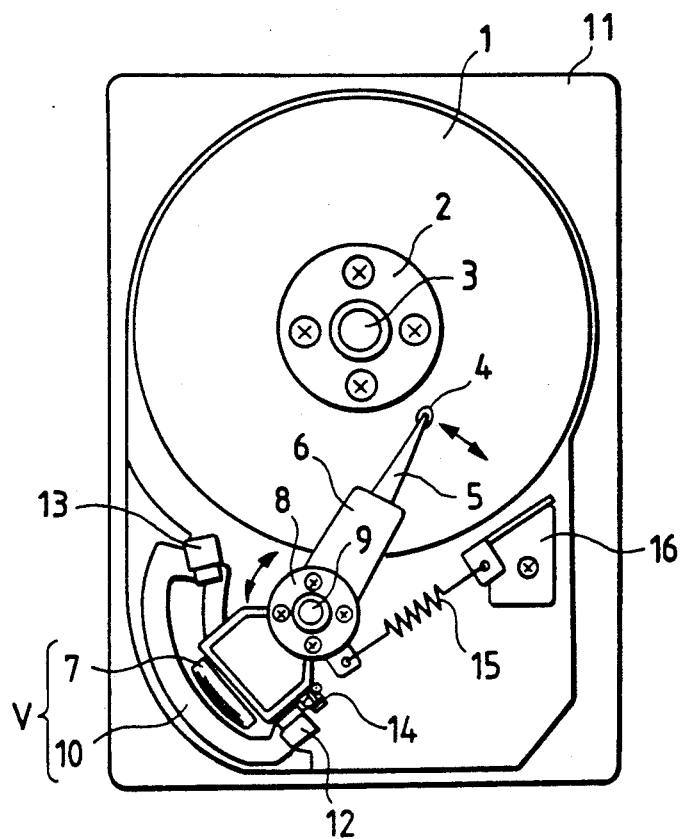
FIG. 1 is a plan view showing an exemplary construction of a magnetic disk device of an embodiment of the present invention.
Figure 2:
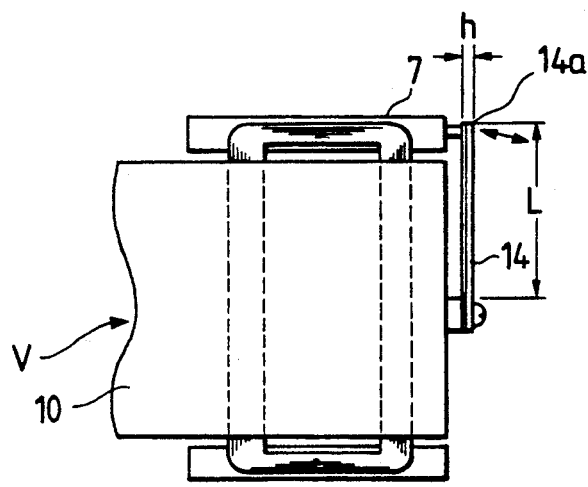
FIG. 2 is a side elevational view of part of the magnetic device shown in FIG. 1.

Referring first to FIGS. 1 and 2, there is shown a magnetic disk device according to a preferred embodiment of the present invention. The magnetic disk device shown includes a casing 11, and a spindle motor 3 mounted on the casing 11. A plurality of magnetic disks 1 are mounted in a predetermined spaced relationship in an axial direction, that is, in a direction perpendicular to the plane of FIG. 1, on the spindle motor 3 with spacers not shown interposed therebetween. The spindle motor 3 and magnetic disk 1 form a member of the device for rotating the disks 11. The magnetic disks 1 are secured to the spindle motor 3 by means of a disk clamp 2 mounted at the top of the spindle motor 3 so that they may rotate together with the spindle motor 3.

A pivot shaft 9 is secured in parallel to the spindle motor 3 to the casing 11 sidewardly of the magnetic disks 1.

A pivot, not shown, is supported for rotation in a plane of rotation of the magnetic disks 1 on the pivot shaft 9, and a plurality of head arms 6 and a coil portion 7 which makes part of a voice coil motor V which will be hereinafter described are mounted on the pivot in a predetermined spaced relationship from each other in the direction in which the magnetic disks 1 are arranged. Thus, the individual head arms 6 are supported for movement in directions of the planes of the magnetic disks 1 near surfaces of adjacent ones of the magnetic disks 1.

Meanwhile, the head arms 6 and the coil portion 7 mounted on the pivot, not shown, are secured in an integrated relationship by means of an arm clamp 8 mounted at a top portion of the pivot.

A pair of load arms 5 are supported on each of the head arms 6, and a magnetic head 4 is supported at an end portion of each of the load arms 5 to form a member of the device in an opposing relationship to a record face of a corresponding one of the magnetic disks 1 and is normally urged toward the record face of a corresponding magnetic disk 1 by the load arm 5.

A yoke 10 is secured in the neighborhood of the pivot shaft 9 and forms a magnetic circuit, not shown, such that it surrounds the coil portion 7. A voice coil motor V is thus constituted from the yoke 10 and the coil portion 7.

When the coil portion 7 is energized, a torque is generated at the coil portion 7 in a direction and with a magnitude corresponding to the direction and amount of energization so that the magnetic heads 4 are displaced at a desired speed in a desired direction in the planes parallel to the magnetic disks 1 by way of the head arms 6 and load arms 5 which are supported on the pivot together with the coil portion 7. Thus, a so-called seeking operation is performed wherein a magnetic head 4 is positioned to a desired position of a corresponding record face of a corresponding magnetic disk.

An inner stopper 12 and an outer stopper 13 for defining the range of movement of the coil portion 7 are provided at the opposite end portions of the yoke 10. The stoppers 12, 13 prevent a magnetic head 4 which is driven to move in a radial direction of a corresponding magnetic disk 1 on the record face of the magnetic disk 1 as described above form being brought into collision with the disk clamp 2 at the central location or with a spacer, not shown, or from moving excessively outwardly by a torque generated by the coil portion 7.

A spring 15 extends between the pivot portion, not shown, on which the head arms 6 and the coil portion 7 are supported and a fixed piece 16 secured to the casing 11 so that the pivot portion is normally urged in the counterclockwise direction in FIG. 1, that is, in a direction in which the magnetic head 4 is moved toward the center of rotation of the magnetic disks 1.

When the coil portion 7 of the voice coil motor V is deenergized, it is pivoted to a position at which it contacts with the inner stopper 12 while the magnetic heads 4 are moved to individual positions proximate the center of the magnetic disks 1, that is, to contact start/stop zones (hereinafter referred to as CSS zone) which will be hereinafter described.

A bimetal 14 is secured at an end thereof to a location adjacent the inner stopper 12 on the yoke 10 supported on the casing 11 as shown in FIG. 2. An operating end 14a of the bimetal 14 is displaced toward or away from the coil portion 7 upon rise or drop of the temperature therearound, and when the coil portion 7 of the voice coil motor V is deenergized, the operating end 14a of the bimetal 14 is contacted with a side face of the coil portion 7 which is contacted with the inner stopper 12.

Operation of the magnetic disk device will be described in the following.

At first, general operation of the magnetic disk device of the CSS system will be described.

When rotation of the magnetic disks 1 is stopped and the coil portion 7 of the voice coil motor V is deenergized as described above, the coil portion 7 is moved by the urging force of the spring 15 to the position at which it contacts with the inner stopper 12 as shown in FIG. 1. Thus, the magnetic heads 4 are positioned in the CSS zones which are proximate to the center of rotation of the magnetic disks 1, that is, at which the relative speed of the magnetic heads 4 to the magnetic disks 1 is at the lowest, and which is not used for normal recording of data.

After rotation of the magnetic disks 1 is started in this condition, sliders, not shown, of the magnetic heads 4 are acted upon by a dynamic lift generated by viscositic flows of air produced along surfaces of the magnetic disks 1 by rotation of the magnetic disks 1 so that they are lifted away from the surfaces 1 of the magnetic disks 1 against the urging forces of the load arms 5.

Then, after the speed of rotation of the magnetic disks 1 reaches a predetermined stable level, the dynamic lift is balanced with the urging forces applied by way of the load arms 5 to press the magnetic heads 4 against the surfaces of the magnetic disks 1. Thus, the magnetic heads 4 are held in a non-contacting opposing relationship to the magnetic disks 4 with a predetermined floating gap left therebetween.

Then, the coil portion 7 of the voice coil motor V is energized. Consequently, the head arms 6 supported on the pivot portion are displaced radially outwardly of the magnetic disks 1 against the urging force of the spring 15 to move the magnetic heads 4 away from the CSS zones to ordinary data zones of the magnetic disks 1 in which a plurality of tracks not shown are provided in a concentrical relationship.

After then, a seeking operation is performed wherein the direction and magnitude of energization of the coil portion 7 are suitably controlled in accordance with an instruction from a controller above, not shown, to suitably move the head arms 6 and load arms 5 in radial directions in a floating condition to position one of the magnetic heads 4 supported at the end portions of the load arms 5 to an object one of the tracks provided in a concentrical relationship on the surface of the corresponding magnetic disk 1. Then, recording or reproduction of data on or from the object track is carried out by the magnetic head 4.

On the other hand, if the power source for the spindle motor 3 for driving the magnetic disks 1 and the coil portion 7 of the voice coil motor V is disconnected in order to stop operation of the magnetic disk device, then the coil portion 7 is pivoted by the urging force of the spring 15 to the position at which it contacts with the inner stopper 12 and the operating end 14a of the bimetal 14. At the same time, the magnetic heads 4 supported on the head arms 6 and the load arms 5 are moved from the data zones till the CSS zones proximate the center of rotation of the magnetic disks 1. In the meantime, rotation of the magnetic disks 1 due to their own inertia is retarded gradually and the dynamic lift acting on the magnetic disks 4 gradually decreases accordingly.

Then, when the magnetic disks 1 are brought into a stopped condition, the magnetic heads 4 are brought into contact with the magnetic disks 1 in the CSS zones by the urging forces of the load arms 5.

In the case of the present embodiment, the magnetic heads 4 stops at such a position at which the pivoting force by the spring 15 is balanced with the urging force applied from the operating end 14a of the bimetal 14 with which the coil portion 7 contacts.

Then, if the environmental temperature varies, the operating end 14a of the bimetal 14 is displaced toward or away from the coil portion 7 by an amount defined by the following equation (1):

$$d = KL^2 t/h \ldots \quad (1)$$

where d is an amount of displacement (mm) of the operating end 14a of the bimetal 14, L is a length (mm) of the bimetal 14, h is a thickness (mm) of the bimetal 14, t is a temperature variation (°C.), and K is a bend coefficient (°C.$^{-1}$). By such displacement, the coil portion 7 and the head arms 6 and load arms 5 which are supported on the pivot portion together with the coil portion 7 are swung around the pivot shaft 9, and such rocking motion finely moves the magnetic heads 4 on the planes of the magnetic disks 1 in a stationary condition.

Consequently, when the magnetic disk device is at rest, whether or not the power source is connected to the magnetic disk device, such a situation is prevented with certainty that the magnetic heads 4 are held in contact with same locations of the magnetic disks 1 in a stationary condition for a long period of time, and possible increase of the adhesive friction between the magnetic heads 4 and the magnetic disks 1 is prevented.

TABLE 1

| | | | | | | (Unit: ° C.) | | | | | | |
|---|---|---|---|---|---|---|---|---|---|---|---|---|
| | Jan. | Feb. | March | April | May | June | July | Aug. | Sept. | Oct. | Nov. | Dec. |
| Highest Temperature | 9.5 | 10.0 | 13.0 | 18.4 | 22.7 | 25.3 | 28.9 | 30.8 | 26.7 | 21.2 | 16.6 | 12.1 |
| Lowest Temperature | 0.5 | 1.2 | 4.2 | 9.8 | 14.5 | 18.4 | 22.2 | 23.6 | 19.9 | 13.9 | 8.4 | 3.3 |
| Temperature Difference | 9.0 | 8.8 | 8.8 | 8.6 | 8.2 | 6.9 | 6.7 | 7.2 | 6.8 | 7.3 | 8.2 | 8.8 | from Chronological Scientific Tables, 1987, published by Maruzen Kabushiki Kaisha Here, Table 1 above indicates monthly normal values of daily lowest and highest air temperatures in Tokyo (statistic period: average values after 1951 till 1980).

As seen from the table, there is a temperature variation of about 7° C. in a day through the year. Thus, necessary displacement of the magnetic heads 4 can be obtained readily by determining the specification of the bimetal 14 taking the urging force of the spring 15 and the magnitude of the adhesive force of the magnetic heads 4 with respect to the magnetic disks 1 at an initial stage into consideration.

In particular, preferably the bimetal 14 is, for example, easy to work and high in its limit of elasticity and also in durability, and has no or little difference in hysteresis.

To this end, where the magnetic disk device is used around an ordinary temperature as in the case of the present embodiment, a combination of invar (Ni 36%, Fe 64%, expansion coefficient $1.2 \times 10^{-6}$ [°C.$^{-1}$]) and brass (Zn 30%, Cu 70%, expansion coefficient $19 \times 10^{-6}$ [°C.$^{-1}$]) is usually employed for the bimetal 14. The following description proceeds with the bimetal 14 consisting of such combination.

In the case of the bimetal 14 of the construction, the bend coefficient K depends upon the expansion coefficients, a ratio in thickness and an adhered condition of the two metals and is $14.0 \times 10^{-6}$ [°C.$^{-1}$] in the case of the present embodiment.

If it is assumed now that a necessary amount of displacement of the magnetic heads 4 caused by a change of the environmental temperature by 10° C. is 0.5 mm and the ratio between a distance from the pivot shaft 9 to the magnetic heads 4 and another distance from the pivot shaft 9 to the location at which the operating end 14a of the bimetal 14 contacts with the coil portion 7 is 2.5:1, then the amount of displacement equal to 0.2 mm should be obtained at the operating end 14a of the bimetal 14.

Accordingly, substituting those values into the equation (1) above, $$0.2 = 14 \times 10^{-6} \times L^2 \times 10/h$$
$$L^2/h = 1.43 \times 10^3$$

is obtained, and if h=1 mm, then L=37.8 mm.

In the case of the present embodiment, the height of the casing 11 is, for example, about 65 mm, and the bimetal 14 having such length can be sufficiently accommodated in the casing 11.

Meanwhile, the dimension of the width of the bimetal 14 which defines the magnitude of moment at the operating end 14a can be calculated from the sliding friction between the individual magnetic heads 4 and magnetic disks 1, the number of the magnetic heads 4 and the moment produced around the pivot shaft 9 by the urging force of the spring 15, and in the case of the present embodiment, the dimension is about 22 mm.

Figure 3:
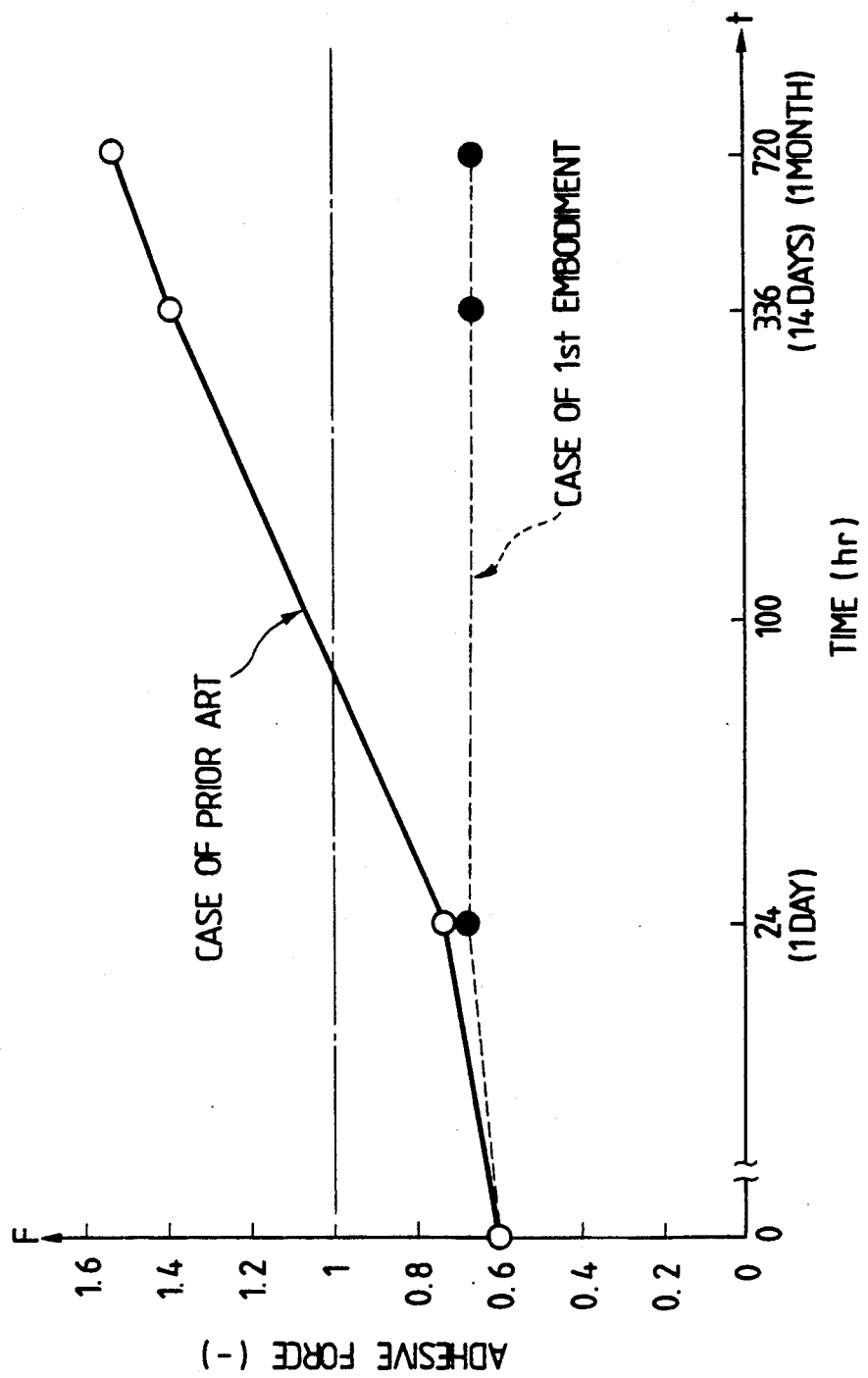
FIG. 3 is a diagram illustrating an exemplary effect of the magnetic disk device shown in FIG. 1.

FIG. 3 illustrates an example of a variation of the adhesive force F with respect to time which occurs between the magnetic heads 4 and the magnetic disks 1. A blank circle indicates an adhesive force when magnetic heads of a conventional magnetic disk device are held in contact with the same locations of magnetic disks in a rest state of the magnetic disk device, while a black circle indicates an adhesive force with the magnetic disk device of the present embodiment.

It is to be noted that the axis of ordinate of FIG. 3 indicates the adhesive force wherein the peeling strength of adhesion of the magnetic heads 4 from the magnetic disks 1 by the spindle motor 3 as calculated from a starting torque is represented as 1.

From the blank circles in FIG. 3 indicating the adhesive forces in the case of the conventional magnetic disk device, it can be seen that when the disconnecting term exceeds 100 hours, the adhesive force between the magnetic disks and the magnetic heads exceeds the adhesive force F corresponding to the starting torque of the spindle motor 3 as indicated by an alternate long and short dash line in FIG. 3, and consequently, it is difficult to start the magnetic disks with the spindle motor.

To the contrary, from the black circles indicating the adhesive forces in the case of the magnetic disk device of the present embodiment, where the magnetic heads 4 are moved finely on the surfaces of the stationary magnetic disks 1 making use of a displacement of the bimetal 14 caused by a variation of the environmental temperature, even if the disconnecting term continues for a long period of time, the adhesive force F presents a value little different from an initial value thereof.

In other words, in the case of the magnetic disk device of the present embodiment, even if the connecting term continues for a long period of time wherein the magnetic heads 4 are held in contact with the magnetic disks 1, starting of rotation of the magnetic disks 1 by the spindle motor 3 can be achieved smoothly.

Further, there is no possibility of damage to the magnetic disks 1 or the magnetic heads 4 which may be caused by starting of the magnetic disks 1 while the magnetic disks 1 are held in an adhered condition to the magnetic disks 1 with an excessively high adhesive force.

Besides, since no special power source or control circuit is required, prevention of adhesion between the magnetic disks 1 and the magnetic heads 4 can be realized at a low cost.

It is to be noted that the magnetic heads 4 are moved back and forth relative to the magnetic disks 1 substantially once in a day in response to a daily variation of the external air temperature by the bimetal 14, and the total amount of movement of the magnetic heads 4 is at most several tens cm or so per month, which does not cause any trouble because such amount is significantly small comparing with the sliding quantity between the magnetic heads 4 and the magnetic disks 1 upon CSS.

Embodiment 2

Figure 4:
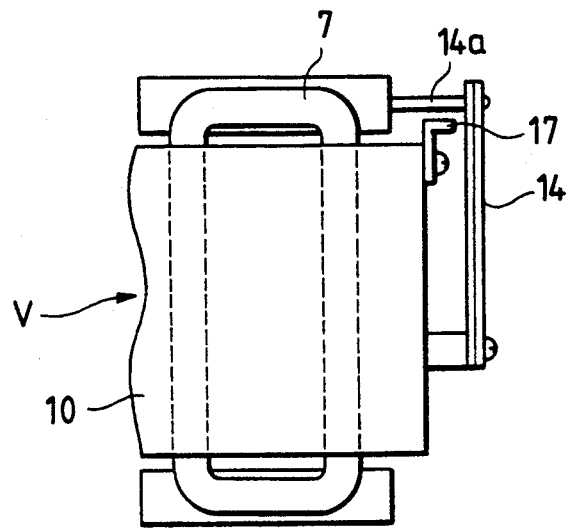
FIG. 4 is a side elevational view showing part of a magnetic disk device of another embodiment of the present invention.

Referring now to FIG. 4, there is shown a part of a magnetic disk device according to another embodiment of the present invention. In the magnetic disk device of the second embodiment shown, a stopper 17 for restricting the range of movement of an operating end 14a of a bimetal 14 is disposed between a yoke 10 and the bimetal 14.

In particular, the bimetal 14 is bent or curved toward a coil portion 7 by a rise of the environmental temperature. However, if the temperature rise is excessively high, then the coil portion 7 which contacts with the operating end 14a of the bimetal 14 is displaced by an excessively great amount. Accordingly, there is the possibility that magnetic heads 4 displaced together with the coil portion 7 may be moved farther than the CSS zones to data zones in which useful data are recorded.

In order to prevent this, the magnetic disk device of the present embodiment is constituted such that, when the operating end 14a of the bimetal 14 tends to be displaced by an excessively great amount, the stopper 17 is contacted with a side face of the bimetal 14 to prevent further displacement of the operating end 14a of the bimetal 14.

Consequently, the magnetic heads 4 are prevented with certainty from being moved farther than the CSS zones to the data zones of the magnetic disks 1 while they are held in contact with the magnetic disks 1, and possible damage to the data zones of the magnetic disks 1 which may be caused by the magnetic heads 4 slidably moving on the magnetic disks 1 is prevented with certainty.

It is to be noted that, when the environmental temperature drops excessively, the bimetal 14 will be bent or curved away from the coil portion 7, which causes no trouble with the magnetic disks 1.

Embodiment 3

Figure 5:
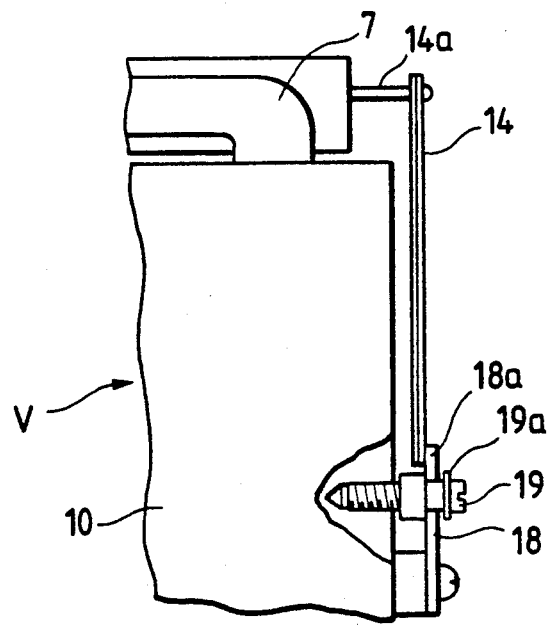
FIG. 5 is a side elevational view showing part of a magnetic disk device of a further embodiment of the present invention.

Referring now to FIG. 5, there is shown part of a magnetic disk device according to a further embodiment of the present invention. The magnetic disk device of the present embodiment includes a resilient member 18 having an end secured to a yoke 10 of a voice coil motor V, and an adjusting screw 19 extending through and engaging, at a greater diameter portion 19a thereof, with the resilient member 18 and screwed into the yoke 10 for adjusting the gap between a free end 18a of the resilient member 18 and the yoke 10.

A bimetal 14 is secured at a base end portion thereof to the free end 18a of the resilient member 14. Thus, the position at which an operating end 14a of the bimetal 14 is contacted with a coil portion 7 at a predetermined temperature can be adjusted in accordance with an amount of turning motion of the adjusting screw 19.

Consequently, the temperature at which displacement of magnetic heads 4 by deformation of the bimetal 14 is started and the range of such displacement can be set readily to optimum values by adjusting the position at which the operating end 14a of the bimetal 14 is contacted with the coil portion 7 in accordance with the highest and lowest temperatures, an average temperature and so forth of the environment in which the magnetic disk is placed.

Embodiment 4

Figure 6:
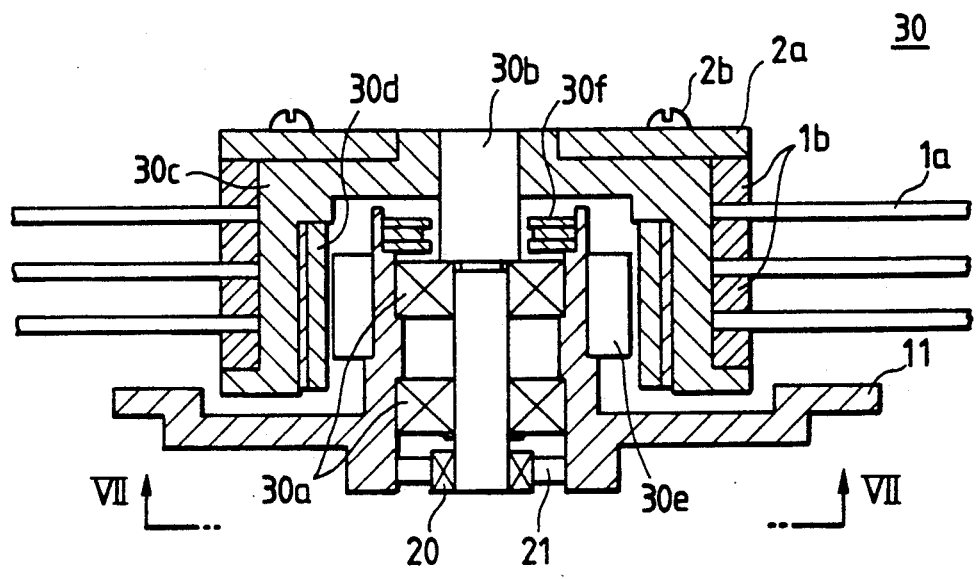
FIG. 6 is a sectional view of a motor incorporated in a magnetic disk device showing a still further embodiment of the present invention.
Figure 7:
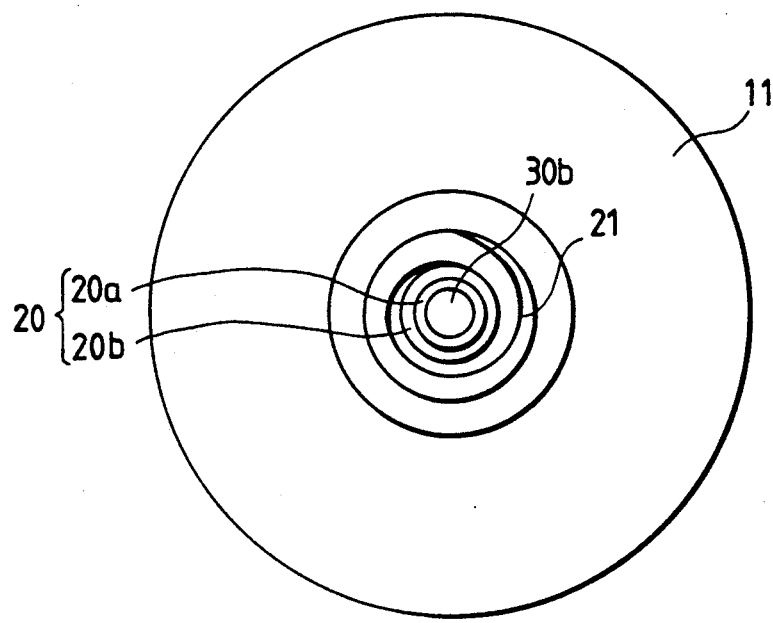
FIG. 7 is a plan view as viewed along line VII—VII in FIG. 6.

Referring to FIGS. 6 and 7, there is shown a magnetic disk device according to a still further embodiment of the present invention. The magnetic disk device of the present embodiment includes a spindle motor 30 having a shaft 30b which extends through and is supported for rotation on a casing 11 of the magnetic disk device by way of a plurality of bearings 30a. A hub 30c in the form of a bottomed tube is secured concentrically to an inner end portion of the shaft 30b.

A plurality of magnetic disks 1a are mounted in parallel to each other on an outer periphery of the hub 30c and spaced from each other in an axial direction of the shaft 30b by means of a plurality of spacers 1b having a predetermined axial length. The magnetic disks 1a are held stably in position by means of a disk clamp 2a secured to and pressed against an end portion of the hub 30c by means of a plurality of screws 2b.

A rotor 30d composed of a permanent magnetic is secured over an entire periphery thereof to an inner periphery of the hub 30c. A stator 30e composed of a coil for forming a rotating magnetic field is secured to the casing 11 in an opposing relationship to the rotor 30d.

Thus, a torque is produced on the hub 30c on which the rotor 30d is supported due to electromagnetic interaction between the rotor 30d and a rotating magnetic field formed by the stator 30e, and the magnetic disks 1a secured to the hub 30c are rotated at a predetermined speed in a direction by the torque.

A magnetic fluid seal 30f is provided at the location of the shaft 30b at which it extends through the casing 11 in order to maintain the air tightness at the location.

A one-way clutch 20 is provided at an outer end portion of the shaft 30b which rotates together with the hub 30c. The one-way clutch 20 includes an inner ring 20a secured to the shaft 30b, and an outer ring 20b which is ineffective when the inner ring 20a is rotated in one direction relative to the outer ring 20b but is coupled, when the inner ring 20a is rotated in the reverse direction, to the inner ring 20a so that it is rotated by and together with the inner ring 20a.

A temperature-displacement converting means 21 formed from a coiled bimetal or a coiled shape-memory alloy is interposed between the outer ring 20b of the one-way clutch 20 and the casing 11. Thus, when the temperature-displacement converting means 21 is deformed by a variation of the environmental temperature, a turning force acts upon the outer ring 20b of the one-way clutch 20.

Subsequently, operation of the magnetic disk device of the present embodiment will be described.

At first, during normal operation of the magnetic disk device, the hub 30c supported on the shaft 30b and the magnetic disks 1a secured to the hub 30c are rotated at a fixed speed in a predetermined direction (hereinafter referred to as operating direction) by a rotating magnetic field formed by the stator 30e of the spindle motor 30.

In this instance, the inner ring 20a and the outer ring 20b of the one-way clutch 20 provided on the shaft 30b do not cooperate with each other, and consequently, the magnetic disks 1a are rotated smoothly as in a conventional magnetic disk device.

On the other hand, if the magnetic disk device is rendered inoperative and then the environmental temperature varies while rotation of the shaft 30b by the spindle motor 30 is held stopped, then the temperature-displacement converting means 21 is deformed so as to rotate the outer ring 20b of the one-way clutch 20 in the same direction as the operating direction.

In this instance, the outer ring 20b of the one-way clutch 20 rotates in the opposite direction to that upon operation of the magnetic disk device relative to the inner ring 20a. Thus, a coupled condition is established between the inner ring 20a and the outer ring 20b of the one-way clutch 20. Consequently, a turning force by such displacement of the temperature-displacement converting means 21 is transmitted to the shaft 30b and the hub 30c by way of the one-way clutch 20 so that the magnetic disks 1a are rotated in the same direction as the operating direction relative to the magnetic heads not shown which remain in a stationary condition in the CSS zones of the magnetic disks 1a.

If the temperature variation occurs reversely, then the temperature-displacement converting means 21 will be deformed reversely. In this instance, however, the direction of rotation of the outer ring 20b of the one-way clutch 20 connected to the temperature-displacement converting means 21 is reverse to that in the case described above, that is, the direction coincides with the direction of relative rotation to the inner ring 20a during normal operation. Consequently, the one-way clutch 20 is inoperative, and no turning force acts upon either of the shaft 30b and the hub 30c.

As a result, the shaft 30b and the magnetic disks 1a supported on the hub 30c are intermittently rotated in the operating direction by expanding and contacting deformation of the temperature-displacement converting means 21 in response to a variation of the environmental temperature.

Therefore, while the magnetic disk device remains in a rest state, the magnetic heads not shown in a stationary condition in the CSS zones of the magnetic disks are prevented from being held in contact with the same locations of the magnetic disks 1a for a long period of time, and consequently, a possible increase of the adhesive force between the magnetic heads and the magnetic disks 1a can be prevented with certainty.

Accordingly, even after a long disconnecting term in a condition wherein the magnetic heads, not shown, are held in contact with the magnetic disks 1a, starting of rotation of the magnetic disks 1a by the spindle motor 30 can be achieved smoothly.

Further, there is no possibility of damage to the magnetic disks 1a or the magnetic heads which may arise from starting of the magnetic disks 1a while the magnetic heads are adhered with an excessively great force to the magnetic disks 1a.

Besides, since no special power source or controlling circuit is required, prevention of adhesion between the magnetic disks 1a and the magnetic heads can be realized at a low cost.

It is to be noted that, while the magnetic disk device of any of the embodiments described makes use of a natural variation of the environmental temperature, if a keeping method is employed wherein the temperature of the environment in which the magnetic disk device is kept is intentionally changed substantially periodically, then a possible increase of the adhesive force between the magnetic disks and the magnetic heads during a disconnecting term can be effectively further prevented.

While the present invention has been described in detail so far in connection with the preferred embodiments thereof, the present invention is not limited to such specific embodiments as described above and many changes and modifications can naturally be made thereto without departing from the spirit and scope of the invention.

For example, the movable holder on which magnetic heads are supported is not limited to such a structure that it is mounted for swinging motion around a pivot shaft but may be a carrier mounted for back and forth movement in a radial direction of magnetic disks.

Meanwhile, the temperature-displacement converting means is not limited to a solid body such as a bimetal or a shape-memory alloy, but may be of any structure which makes use of thermal expansion and contraction such as liquid or gas only if it can convert a variation of the environmental temperature into a mechanical displacement.

While the magnetic disk devices of the various embodiments have been described in detail so far, the present invention can be applied to various mechanical devices having movable contacts therein. For example, where the present invention is applied to a shutter device of a camera wherein rust or mildew may appear, when the camera is left out of use for a long period of time, on a sliding contact face of the shutter to increase the sliding resistance of the shutter remarkably so that the shutter may not be opened or closed regularly, such failure can be prevented with certainty.

Effects which can be attained by the present invention disclosed herein will be described briefly in the following.

In particularly, where the present invention is applied to a popular mechanical apparatus having movable contacts, an adhesive phenomenon or a so-called ringing phenomenon of the movable contacts can be prevented, and such a situation can be prevented so that operation of the movable contacts becomes less smooth due to rust or mildew which may appear when the apparatus is left in an inoperative condition for a long period of time.

Further, with a magnetic disk device according to the present invention, since a displacement which is caused in a temperature-displacement converting means by a variation of the environmental temperature is transmitted to a magnetic head which contacts with a magnetic disk in a stationary state by way of a movable holder kept in touch with the temperature-displacement converting means, for example, whether or not a power source is connected to the magnetic disk device; a possible increase of the sliding friction between the magnetic disk and the magnetic head which arises from the fact that the condition wherein the magnetic head continuously contacts the same location of the magnetic disk, can be prevented with certainty.

Further, with a magnetic disk device which employs a one-way clutch, since the magnetic disk which is held in contact with the magnetic head while rotation thereof by the first driving means is stopped is rotated in the predetermined one direction by a displacement which is caused in the temperature-displacement converting means by a variation of the environmental temperature; a possible increase of the adhesive force between the magnetic disk and the magnetic head which arises from the fact that the condition wherein the magnetic head continuously a particular location of the magnetic disk, can be prevented.

Further, the present invention is effective, as a novel method of storing a magnetic disk device, to intentionally change the environmental temperature of the magnetic disk device. With the method, a displacement can be caused with certainty in the temperature-displacement converting means incorporated in the magnetic disk device, and by such displacement the condition occurring when the magnetic head continuously contacts with a particular location of the magnetic disk, can be prevented.

Further, a possible increase of the adhesive force between the magnetic disk and the magnetic head can be prevented.

In addition, the present invention provides a motor for driving such mechanical apparatus. The motor rotates the magnetic disk in a predetermined one direction relative to the magnetic head in a stationary condition whether or not a power source is connected to the motor during a disconnecting term such as when the magnetic disk device is at rest. Consequently, a possible increase of the adhering force between the magnetic disk and the magnetic disk which arises from the fact that the condition wherein the magnetic head contacts with a particular location of the magnetic disk continues can be prevented.

What is claimed is:

1. A mechanical apparatus having a mechanism for preventing conglutination of contact parts, comprising:
    a first member;
    a second member for movably contacting with said first member;
    actuator means for moving said second member relative to said first member; and
    a temperature-displacement converting means combined with said actuator means for moving said second member relative to the first member in response to a variation of the environmental temperature independent of the movement performed by said actuator means.

2. The mechanical apparatus according to claim 1, further comprising a one-way clutch which is put into a coupled condition with said first member only when the relative displacement by said temperature-displacement converting means takes place in a predetermined direction, and put into a non-coupled condition when the relative movement is caused by said actuator means.

3. A method of storing a mechanical apparatus during periods of non-use, the apparatus includes a first member, a second member for movably contacting with said first member, actuator means for moving said second member relative to said first member, and a temperature-displacement converting means combined with said actuator means for moving said second member relative to the first member in response to a variation of the environmental temperature independent of the movement performed by said actuator means, said method comprising compulsorily changing the environmental temperature at least of said temperature-displacement converting means.

4. A method of storing a magnetic disk device which includes a magnetic disk, means for supporting said magnetic disk rotatably, a magnetic head for recording or reproducing information on or from said magnetic disk actuator means for supporting said magnetic head, motor means for driving said actuator means in order to position said magnetic head on a desired disk track of said magnetic disk and, a temperature-displacement converting means, which is arranged adjacent to said actuator means, for moving said actuator means slightly in response to a variation of the environmental temperature, said method comprising the step of compulsorily changing the environmental temperature at least of said temperature-displacement converting means.

5. A method according to claim 4, wherein the compulsory change of the environmental temperature is a substantially periodic change.

6. A magnetic disk device comprising:
    a magnetic disk;
    means for supporting said magnetic disk rotatably;
    a magnetic head for recording/reproducing information to/from said magnetic disk;
    actuator means for supporting said magnetic head;
    motor means for driving said actuator means in order to position said magnetic head on a desired disk track of said magnetic disk; and
    temperature-displacement converting means, arranged adjacent to said actuator means, for moving said actuator means slightly in response to a variation of the environmental temperature.

7. The magnetic disk device according to claim 6, wherein said motor means comprises:
    generating means for generating magnetic flux, said generating means secured to the actuator means; and
    interacting means for interacting with said generated magnetic flux;
    wherein said temperature-displacement converting means is secured to said interacting means.

8. The magnetic disk device according to claim 7, wherein said temperature-displacement converting means comprises:
    a bimetal, one end of which is secured to said interacting means; and
    contacting means for contacting said actuator means in order to transmit a temperature-displacement force.

9. The magnetic disk device according to claim 8, further comprising means for limiting a range of displacement of said temperature-displacement converting means, said limiting means being secured to said interacting means.

10. The magnetic disk device according to claim 8, further comprising means for adjusting the position of said temperature-displacement converting means, said adjusting means being disposed between said interacting means and said temperature-displacement converting means.

11. A magnetic disk device comprising:
    a magnetic disk;
    hub means for rotatably supporting said magnetic disk;
    motor means for rotating said hub means;
    a magnetic head for recording/reproducing information to/from said magnetic disk;
    actuator means for supporting said magnetic head;
    motor means for driving said actuator means to position said magnetic head on a desired disk track of the magnetic disk;
    temperature-displacement converting means for moving said hub means slightly in response to a variation of the environmental temperature, independent of said driving of said actuator means.

12. The magnetic disk device according to claim 11, further comprising:

a shaft secured to said hub means; and
a base member;
wherein said temperature-displacement converting means is disposed between said shaft and said base member.

13. The magnetic disk device according to claim 12, further comprising a one-way clutch for transmitting a driving force of said temperature-displacement converting means to said hub means when said motor means rotates.

14. The magnetic disk device according to claim 13, further comprising clutch means for transmitting the driving force in a predetermined direction from said temperature-displacement converting means to said shaft, by said one way clutch.

* * * * *